(12) United States Patent
Wang et al.

(10) Patent No.: US 6,736,550 B1
(45) Date of Patent: May 18, 2004

(54) HOUSING FOR PASSIVELY ALIGNING AN OPTICAL FIBER WITH A LENS

(75) Inventors: Chung-Yung Wang, Sugar Land, TX (US); Hung-Lun Chang, Sugar Land, TX (US)

(73) Assignee: Applied Optoelectronics, Inc., Sugar Land, TX (US)

(*) Notice: Subject to any disclaimer, the term of this patent is extended or adjusted under 35 U.S.C. 154(b) by 0 days.

(21) Appl. No.: 10/631,633

(22) Filed: Jul. 31, 2003

(51) Int. Cl.[7] .................................................. G02B 6/36
(52) U.S. Cl. ............................ 385/79; 385/33; 385/119
(58) Field of Search ........................ 385/53–61, 70–79, 385/31–34, 88, 92–93, 119

(56) References Cited

U.S. PATENT DOCUMENTS

| | | | | |
|---|---|---|---|---|
| 4,281,891 A | * | 8/1981 | Shinohara et al. ............. 385/33 |
| 4,573,760 A | * | 3/1986 | Fan et al. ...................... 385/85 |
| 4,714,315 A | * | 12/1987 | Krause ........................ 385/96 |
| 5,127,074 A | * | 6/1992 | Watanabe et al. ............. 385/93 |

* cited by examiner

*Primary Examiner*—Khiem Nguyen
(74) *Attorney, Agent, or Firm*—N. Stephan Kinsella

(57) ABSTRACT

A lens-fiber alignment housing for passively aligning an optical fiber with a lens, for improved alignment of a laser with the fiber, via the lens. The fiber is disposed in a substantially cylindrical, annular ferrule, the bottom end of which is disposed in the first end of a ferrule sleeve. The housing has an upper cylindrical mating section at a first end for mating with the second end of the ferrule sleeve, and a bottom lens-receiving section for securely receiving and mounting a lens. The lens may be mounted into the lens-receiving section of the housing, so that, when the housing is inserted into the second end of the ferrule sleeve, the lens and fiber are automatically, passively aligned, thereby forming an aligned lens-fiber assembly that can be aligned with the laser in a single active alignment procedure.

2 Claims, 4 Drawing Sheets

HOUSING FOR PASSIVELY ALIGNING AN OPTICAL FIBER WITH A LENS

BACKGROUND OF THE INVENTION

1. Field of the Invention

This invention relates to laser packaging and, in particular, to apparatuses and methods for optically coupling optical fibers to semiconductor lasers.

2. Description of the Related Art

The following descriptions and examples are not admitted to be prior art by virtue of their inclusion within this section.

There are several types of lasers, including gas lasers, solid-state lasers, liquid (dye) lasers, free electron lasers, and semiconductor lasers. All lasers have a laser cavity defined by at least two laser cavity mirrors, and an optical gain medium in the laser cavity. The gain medium amplifies electromagnetic radiation (light) in the cavity by the process of stimulated emission.

In semiconductor lasers, a semiconductor active region serves as the gain medium. Semiconductor lasers may be diode (bipolar) lasers or non-diode, unipolar lasers such as quantum cascade (QC) lasers. Semiconductor lasers may also be edge-emitting lasers or surface-emitting lasers (SELs). Edge-emitting semiconductor lasers output their radiation parallel to the wafer surface, in contrast to SELs, in which the radiation output is perpendicular to the wafer surface, as the name implies. In conventional Fabry-Perot (FP) edge-emitting lasers, a cleaved facet mirror is used to obtain the feedback for laser oscillation. Other semiconductor lasers, such as distributed-feedback (DFB) and distributed-Bragg reflector (DBR) lasers, employ one or more diffraction gratings to provide reflectance.

Semiconductor lasers are used in a variety of applications, such as high-bit-rate optical fiber communications. In telecommunications applications, the laser often emits at a single lasing wavelength at 1.31 $\mu$m (and other closely spaced wavelengths), or at telecommunications wavelengths specified by the ITU grid, such as lasing wavelengths of 1.55 $\mu$m (and other closely spaced wavelengths). These wavelength ranges are often used for telecommunications purposes because the loss of silica fibers is comparatively low at these wavelengths.

Lasers must be optically coupled to fibers to engage in optical fiber communications. For example, a 1310 nm edge-emitting laser's output must be optically coupled into the input (light-receiving) end of an optical fiber in order to transmit via the fiber a modulated optical signal generated and output by the laser. It can be difficult, expensive, and time-consuming to properly couple the laser to the fiber. For example, it is difficult to accurately align the laser relative to the fiber or other optical device to which it is to be coupled, so that a sufficient amount of laser light output by the laser is coupled into the fiber. When using a lens which is to be optically interposed between the fiber and laser, the three elements are preferably positioned with respect to each other to achieve sufficient optical coupling.

Active alignment is usually employed to align the fiber with respect to the laser. After the fiber is actively aligned to the laser, the alignment process is completed by mounting its ferrule or other housing to a laser housing such as a TO can housing by a variety of techniques such as laser welding, or by using an appropriate adhesive such as epoxy or glue.

During the alignment process, the lens is either actively aligned, or it is not. If the lens itself is actively aligned with respect to the laser, alignment complexity is increased because the fiber must also be aligned. If the lens is not aligned, the fiber may be actively aligned given whatever position the lens has, but it may not be an optimal combination.

For example, in some conventional techniques, the laser and the input end of the optical fiber to which the laser is to be optically coupled are mounted together in a housing such as a TO (transistor outline) can, along with optics such as a lens disposed between the laser and the fiber end. The fiber end may be disposed in a rigid cylindrical ferrule. Because the lens is between the laser and the fiber, ideally the fiber, lens, and laser are all aligned with respect to each other so that the laser is optically coupled to the fiber. The alignment may therefore involve a first alignment in which the lens is aligned with respect to the laser, and then the fiber is aligned with respect to the already-aligned laser-lens assembly. This requires at least two separate active alignment procedures, adding to alignment complexity.

Alternatively, the lens may simply be placed into fixed position with respect to the laser without actively aligning it, and then aligning the fiber end with respect to the laser-lens assembly. This technique requires only one alignment, but may result in nonoptimal optical coupling if the lens and laser are not properly aligned.

BRIEF DESCRIPTION OF THE DRAWINGS

Other features and advantages of the invention will become apparent upon study of the following description, taken in conjunction with the attached FIGS. 1–4.

DETAILED DESCRIPTION OF THE INVENTION

Figure 1:
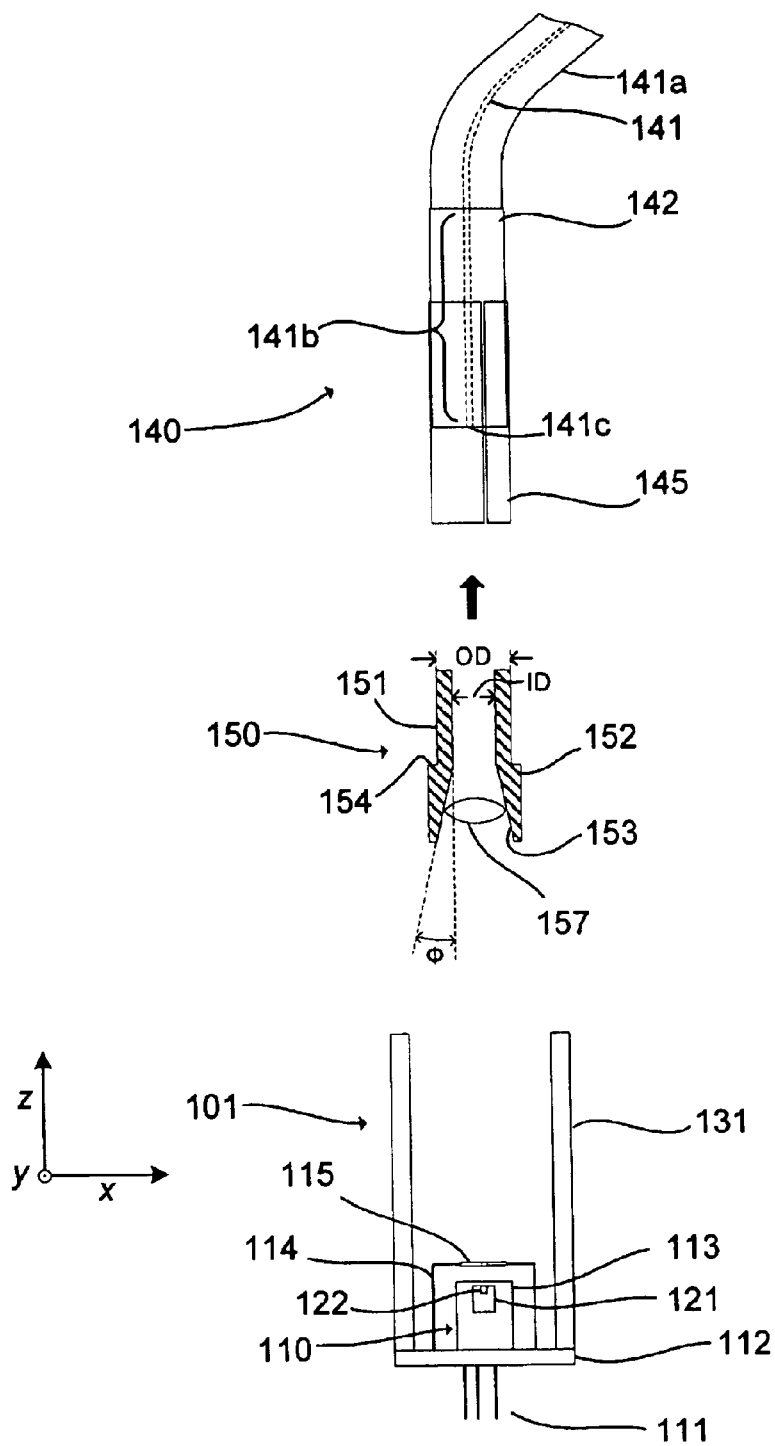
FIG. 1 is a cross-sectional view of an assembly including a laser housing; a fiber portion having a fiber, ferrule, and ferrule sleeve; and a lens-fiber alignment housing for passively aligning the optical fiber with a lens, for improved alignment of the laser with the fiber, via the lens, in accordance with an embodiment of the present invention.

Referring now to FIG. 1, there is shown a cross-sectional view of an assembly 100 including a laser housing 101; a fiber portion 140 having a fiber 141, ferrule 142, and ferrule sleeve 145; and a lens-fiber alignment housing 150 for passively aligning the optical fiber 141 with a lens 157, for improved alignment of the laser 122 with the fiber 141, via the lens 157, in order to optically couple the laser to the fiber, in accordance with an embodiment of the present invention (dimensions shown not necessarily to scale).

In an embodiment, laser housing 101 is a TO can housing 101 comprising a substantially round (disc-like) base 112 and substantially cylindrical housing walls 131 mounted to base 112. TO can housing 101 preferably has a laser mounting feature or platform or means such as a TO can. The TO can comprises TO header 110 and TO cap 114, also mounted to base 112, for receiving and mounting a laser 122. TO header 110 comprises TO can post 113, also mounted to base 112, and electrical connection pins 111, which are electrically connected to TO can post 113 and which extend down through the bottom of base 112, for connection to external electronic drive and monitoring circuitry. TO cap 114 is mounted on base 112, around and over the TO can post 113. A transparent window 115, which may consist of glass or other suitable material, is disposed in a central opening in the top portion of TO cap 114. A laser submount 121, having laser 122 mounted thereon, is mounted on the TO can post 113, so that laser 122 emits its output laser radiation upward (along the z axis, parallel to the central axis of housing walls 131), through the window 115, during operation thereof. In alternative embodiments, a laser mounting platform other than a TO can may be employed.

Fiber portion 140 comprises the optical fiber 141 to which laser 122 is to be optically coupled, and other components used to mount fiber 141 with respect to laser 122, such as fiber ferrule 142 and ferrule sleeve 145. Ferrule sleeve 145 is, in an embodiment, a ceramic split sleeve, i.e. a sleeve having an axial slit, which is suitable for use in receptacle applications. Ferrule sleeve 145 may also be made of other materials, such as metal or plastic.

Fiber 141 has an end section 141b disposed in a rigid cylindrical ceramic ferrule 142. Alternatively, ferrule 142 may also be made of other suitable materials, such as metal or plastic. Ferrule 142 has a tubular (cylindrical) ferrule body having a cylindrical outer surface and a through-hole formed therethrough, along the axis thereof, with an inner diameter (ID) sufficient to receive and securely hold fiber end section 141b of the optical fiber 141, with optical fiber end section 141b disposed along the central axis of ferrule 142, in the through-hole. Fiber end section 141b terminates in an light-receiving (input) end 141c. The portion of fiber 141 extending outside and beyond (above) ferrule 142 will typically be disposed in fiber optical cable outer jacket 141a. Ferrule 142 has first (bottom) and second (top) ends, where the bottom end is the end nearest fiber input end 141c, and the top end is the end abutting fiber outer jacket 141a.

The bottom end of ferrule 142 is disposed in a first (upper) end of annular ferrule sleeve 145. The second (lower) end of ferrule sleeve 145 extends away from the bottom end of ferrule 142. In an embodiment, in its relaxed state the ID of split ferrule sleeve 145 is slightly smaller than the OD of ferrule 142, such that when the first end of sleeve 145 is placed on the end of ferrule 142, the slit permits the sleeve to slightly open so that sleeve 145 achieves a secure, snug fit on ferrule 142. Split ferrule sleeve 145 thus serves as a female receptacle to receive and securely hold male ferrule 142.

In order to optically couple laser 122 to optical fiber 141, via a lens 157, these elements must be aligned with respect to each other so that, during operation, laser light output from the laser, after being transmitted through the lens 157, is coupled into the input end 141c of the fiber sufficient for a laser light signal to be transmitted via the fiber. The signal is produced by appropriately modulating the laser light generated by the laser, for example by direct modulation. Lens-fiber alignment housing 150 allows the lens 157 to be passively, yet precisely, aligned with respect to fiber 141, so that the lens-fiber assembly can then be aligned in a single active alignment procedure, with laser 122.

Lens-fiber alignment housing 150 has an annular, substantially cylindrical mating section or means 151 at a first ("upper") end, for mating with ferrule 142 and fiber 141 using ceramic sleeve 145; and a lens-receiving section or means 152 at a second ("lower") end opposite the first end, for securely receiving and mounting lens 157. Housing 150 is preferably rigid and composed of any suitable material, such as metal, plastic, or ceramic. Upper mating section 151 has an OD approximately equal to the OD of ferrule 142, which permits it to be securely fit into the bottom portion of sleeve 145, at its second (lower) end.

The length of the mating section 151 may be defined by an external ledge or step 154, which separates the upper mating section 151 from a larger OD lower section 152. In an embodiment, housing 150 may be inserted into ferrule sleeve 145 until its top end butts up against the bottom end of ferrule 142. In this case, the axial length of the upper mating section 151 as defined by ledge 154 is approximately equal to, or greater than, the axial length of the bottom portion of ferrule sleeve 145 extending from ferrule 142. Alternatively, ledge 154 may be used to precisely define the axial separation between housing 150 and ferrule 142, by butting it up against the bottom end of ferrule sleeve 145, which extends a desired, predetermined axial distance from the bottom end of ferrule 142. In this case, the axial length of the upper mating section 151 as defined by ledge 154 is less than the axial length of the bottom portion of ferrule sleeve 145 extending from ferrule 142.

Lens-receiving section 152 is configured to receive and secure the lens 157 at a precise, axially centered position. Lens 157 may be any suitable lens, such as an aspherical lens or ball lens. In an embodiment, to ensure that lens 157 is automatically aligned with respect to the housing, the inner walls 153 of the lens-receiving section 152 the housing are tapered at angle $\phi$, from a major ID at the bottom thereof, which major ID is larger than the OD of lens 157, to a minor ID at the top thereof, which minor ID is smaller than the OD of lens 157. The lens is positioned inside the inner walls 153 of lens-receiving section 152, until the ID of the tapered walls 153 just matches the OD of the lens. The lens may be secured in this position by epoxy or other suitable techniques.

Housing 150 comprises an axial through-hole extending through the mating section 151 and the lens-receiving section 152, from the first to the second end of the housing. The through-hole contains the substantially cylindrical inside hole of mating section 151 and the tapered opening defined by the inner walls 153 of lens-receiving section 152.

The ID of the central opening of mating section 151 (the same as the minor ID of the lens-receiving section 152) is large enough so that light may be transmitted from laser 122, through lens 157, and though the central opening of mating end 151 into fiber light-receiving end 141c. Thus, when the ferrule 142 (and thus fiber light-receiving end 141c) is disposed in the first (top) end of the ferrule sleeve 145, the mating section 151 is disposed in the second end of the ferrule sleeve 145, and the lens 157 is disposed in the lens-receiving section 152, the lens has a predetermined, fixed position with respect to the light-receiving end 141c of the fiber 141 thereby forming a passively aligned lens-fiber assembly 200, as illustrated in FIG. 2.

With a predetermined size and shape of lens 157, and of walls 153, when lens 157 is mounted in lens-receiving section 152, it is automatically fixed at a predetermined axial distance (z direction) in housing 150, and also centered on the axis (fixed in the x and y directions) of the housing and its through-hole. Accordingly, since the housing 150 is rigid, lens 157 is automatically aligned and positioned with respect to the top opening of housing 150, and thus to fiber light-receiving end 141c when ferrule 142 and housing 150 are fixed with respect to each other by means of split sleeve 145. The light-receiving end 141c of the fiber is also centered on the axis of housing 150, because it is disposed in the central through-hole of ferrule 142, which is also axially aligned with the axis of housing 150. Thus, by employing housing 150, lens 157 may be automatically aligned inside the housing. When assembled, the lens and fiber are passively aligned together.

In an embodiment, various elements shown in FIG. 1 have the following approximate dimensions: the angle φ is about 13°; the OD of fiber ferrule 142 and the OD of the mating end 151 of housing 150 are about 2.5 mm; the ID of ferrule sleeve 145, when relaxed, is about 2.48 mm; the major and minor IDs of inner tapered walls 153 are about 2.73 mm and 1.9 mm, respectively; and the axial length of mating end 151 is about 1.42 mm and the overall axial length of housing 150 is about 3.24 mm. Thus, the ID of the central opening of mating section 151 is about 1.9 mm. Lens 157 may have an OD of about 2.6 mm, smaller than the major ID, but larger than the minor ID, of tapered inner walls 153.

Figure 2:
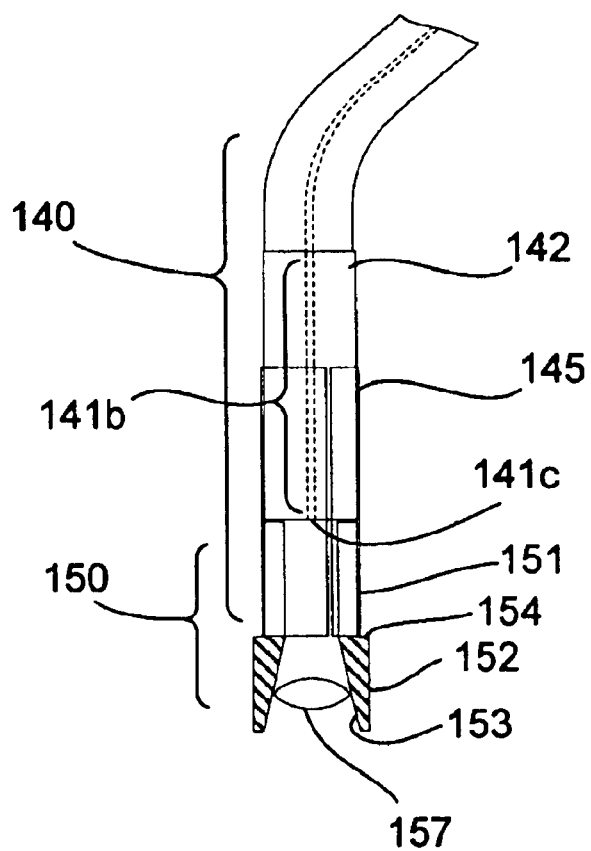
FIG. 2 is a cross-sectional view of the fiber and alignment housing portions of the assembly of FIG. 1 after the passive alignment of the fiber with the lens, in accordance with an embodiment of the present invention.

Referring now to FIG. 2, there is shown a cross-sectional view of the fiber and alignment housing portions of the assembly of FIG. 1 after the passive alignment of the fiber with the lens, forming a passively-aligned lens-fiber assembly 200, in accordance with an embodiment of the present invention. As illustrated in FIG. 2, when housing 150 is inserted into the ceramic sleeve 145, it is automatically, passively aligned with the fiber 141, and in particular with fiber light-receiving end 141c, since the cylindrical ceramic sleeve 145 holds housing 150 and ferrule 142 in fixed and predetermined position with respect to one another. Ferrule sleeve 145 serves as a double-ended female receptacle, for receiving both the mating section of housing 150 and the fiber ferrule 142, to bring them into secured, fixed position relative to each other. Also, since the cylindrical, annular ferrule sleeve 145 is automatically axially centered with each of the cylindrical members inserted into it (to-wit, mating section 151 and ferrule 142), mating section 151 and ferrule 142 are automatically axially aligned with each other, i.e. their axes are parallel and in-line.

Figure 3:
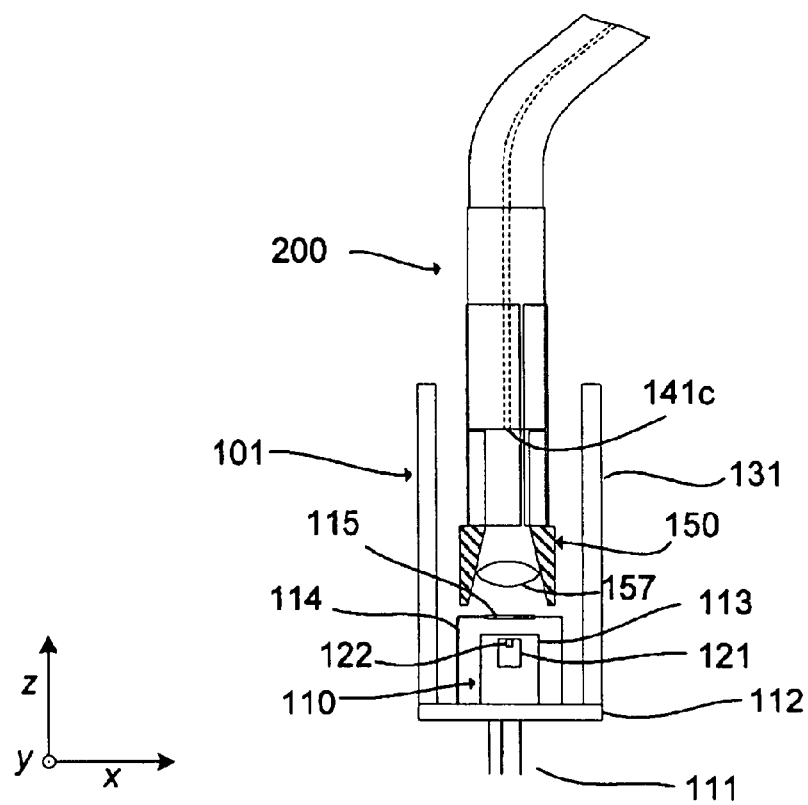
FIG. 3 is a cross-sectional view of the assembly of FIG. 1 after the passive alignment of the fiber with the lens and after active alignment of the lens-fiber assembly with the laser, in accordance with an embodiment of the present invention.

After passively aligning lens 157 with fiber 141 by use of housing 150, the fiber 141 of lens-fiber assembly 200 is actively aligned with laser 122, as illustrated in FIG. 3. Lens-fiber assembly 200 is moved down into the inner region of cylindrical walls 131 of TO can housing 101, thus bringing lens 157 closer laser 122. During this active alignment phase, laser 122 is powered on and the signal emitted out of the other end of fiber 141 (not shown) is monitored. The position of lens 157 and fiber light-receiving end 141c is adjusted, with respect to laser 122, by assembly 200 in x, y, and z directions, until the desired optical coupling is achieved. After the fiber is actively aligned to the laser, the alignment process is completed by mounting portions of assembly 200 to laser housing 101, by any suitable mounting technique such as laser welding, or by using an appropriate adhesive such as epoxy or glue.

Thus, in a method in accordance with the present invention, a fiber 141a is disposed in a ferrule 142 so that its light-receiving end 141c is axially centered in the ferrule and placed at the first (bottom) end of the ferrule. The first end of the ferrule is inserted into a first end of a ferrule split sleeve. A lens is disposed in the lens-receiving section of a lens-fiber alignment housing of the present invention, and the mating section of the lens-fiber alignment housing is inserted into the second end of the ferrule split sleeve, thereby passively aligning the lens with the fiber. The passively-aligned lens-fiber assembly may then be actively aligned with a laser.

Figure 4:
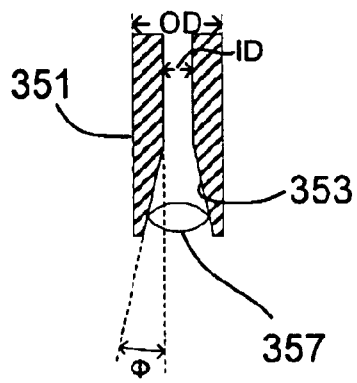
FIG. 4 is a cross-sectional view of an alternative lens-fiber alignment housing, in accordance with an embodiment of the present invention.

Referring now to FIG. 4, there is shown a cross-sectional view of an alternative lens-fiber alignment housing 350, in accordance with an embodiment of the present invention. Unlike housing 150, alternative housing 350 does not contain a step of ledge, but has a cylindrical outer surface and constant OD which may be approximately 2.5 mm, so that it can mate with sleeve 145. The inner walls 353 of the bottom, lens-receiving end are tapered, as with housing 150, so as to receive lens 357 in a known position. The major ID and inner ID of tapered inner walls 353 may be about 1.84 mm and 1.67 mm, respectively, and may extend over an axial length of about 1.66 mm, having a taper angle φ of about 3°. Thus the ID of the upper, mating end of housing 350 is about 1.67 mm. Lens 357 may have an OD of about 1.75 mm, but in any event it is between the major and minor IDs of tapered inner walls 353.

In embodiments described above, the lens-receiving section of the housing has tapered inner walls for receiving the lens. This permits lenses of various shapes to be employed, so long as the OD of the lens is smaller than the major ID, and larger than the minor ID, of the tapered inner walls. In alternative embodiments, the lens-receiving section of the housing need not necessarily have tapered inner walls for receiving the lens. Other suitable lens-receiving configurations are contemplated. For example, the lens-receiving section could have a substantially cylindrical through-hole, with a ridge, step, ledge or other feature designed to facilitate the placement of a lens of known size and shape at a precise, predetermined position in the housing.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims (if any), giving full cognizance to equivalents in all respects.

What is claimed is:

1. A housing for passively aligning a lens with an optical fiber to form a passively aligned lens-fiber assembly, the housing comprising:

(a) an annular mating section at a first end of the housing for mating with a second end of an annular ferrule sleeve, the annular mating section having a mating section opening extending axially through the first end of the housing; and (b) a lens-receiving section at a second end of the housing, opposite said first end of the housing, for securely receiving and mounting the lens, the lens-receiving section having a lens-receiving opening extending axially through the second end of the housing and joining with the mating section opening to form an axial through-hole extending through the housing, wherein the fiber has a fiber end section terminating in a light-receiving end;

whereby, when (i) the fiber end section is disposed in a ferrule, (ii) the ferrule and light-receiving end of the fiber are disposed in a first end of the ferrule sleeve opposite the second end of the ferrule sleeve, (iii) the mating section is disposed in the second end of the ferrule sleeve, and (iv) the lens is disposed in the lens-receiving section: the lens has a predetermined, fixed position with respect to the light-receiving end of the fiber, thereby forming a passively aligned lens-fiber assembly.

2. A method for passively aligning a lens with an optical fiber to form a passively aligned lens-fiber assembly, the method comprising the steps of: disposing a fiber in a ferrule so that its light-receiving end is axially centered in the ferrule and placed at the bottom end of the ferrule; inserting the first end of the ferrule into a first end of a ferrule split sleeve; disposing a lens in the lens-receiving section of a lens-fiber alignment housing, and inserting the mating section of the lens-fiber alignment housing into the second end of the ferrule split sleeve, thereby passively aligning the lens with the fiber; and actively aligning the passively-aligned lens-fiber assembly with a laser.

* * * * *